United States Patent Office 2,935,526
Patented May 3, 1960

2,935,526

TREATMENT OF CERTAIN ALLYLIC TERPENE ALCOHOLS AND RELATED COMPOUNDS

Joseph P. Bain, Jacksonville, Fla., assignor to The Glidden Company, Cleveland, Ohio, a corporation of Ohio No Drawing. Application September 7, 1955
Serial No. 533,234

18 Claims. (Cl. 260—489)

The present invention relates to the preparation of piperitols and isopiperitenols and esters of these, and the interconversion of cis- and trans-isomers of members of this group of compounds.

It is known that piperitol exists in cis- and trans-forms, as well as in optically active and racemic forms. The piperitols can be hydrogenated to menthols; see Simonsen, "The Terpenes," volume I, and see MacBeth and Shannon, "Journal of The Chemical Society," 1952, page 2852. Isopiperitenol also occurs in optically active and in cis- and trans-forms, as well as in racemic form. For preparation and properties of isopiperitenol see copending Serial No. 348,825, filed April 14, 1953. Isopiperitenols can be selectively hydrogenated to piperitols or can be saturated by hydrogen to form menthols.

Also, the piperitols and isopiperitenols can be oxidized to the corresponding ketones, piperitone or isopiperitenone, and these can be selectively hydrogenated to menthone or dehydrogenated to thymol.

Since menthol, thymol and menthone are valuable products used in the perfumery, flavoring and pharmaceutical industries, the production of suitable intermediates useful for their preparation is of special interest. Since l-menthol is the menthol isomer commanding the largest market, a process for producing it from domestic and cheap raw materials is of greatest interest.

Pinenes or limonenes are suitable hydrocarbons to employ as raw materials for synthesis of the starting materials capable of conversion by our process to menthols, etc. by this instant invention. If the pinenes and limonene be optically active, the conversion products will likewise be optically active.

If racemic menthol, racemic menthone or if thymol is to be produced, the raw material need not be optically active, nor is it necessary to choose between cis- and trans-forms of the piperitols or isopiperitenols. If optically active menthol or menthone and derivatives are to be produced from piperitols by hydrogenation, followed by appropriate subsequent treatments, then it is necessary to start with optically active raw materials to produce piperitols and to choose that optically active cis- or trans-form of piperitol which by hydrogenation and equilibration will yield the desired optically active menthol. If optically active piperitone is to be produced, it is necessary to employ optically active hydrocarbons, but it is not necessary to separate the piperitols or to interconvert them.

The relationships of the optically active hydrocarbons and intermediates to optically active menthol, etc. are shown in Chart 1 as these relationships affect our process. Chart 1 depicts the processing of some of the optically active products related to d-limonene and l-alpha-pinene.

With respect to Chart 1, it is desired to emphasize:

(1) The reversibility of the interconversions of the four-component system, the cis- and trans-forms of 2-menthene-1-ol and the cis- and trans-forms of piperitol.

(2) The separability of cis- and trans-piperitols by fractional distillation.

(3) The fact that l-menthol can result only by hydrogenation of d-cis-piperitol to d-neomenthol followed by conversion to l-menthol.

(4) The fact that l-trans-piperitol can yield only l-isomenthol which converts to d-menthol.

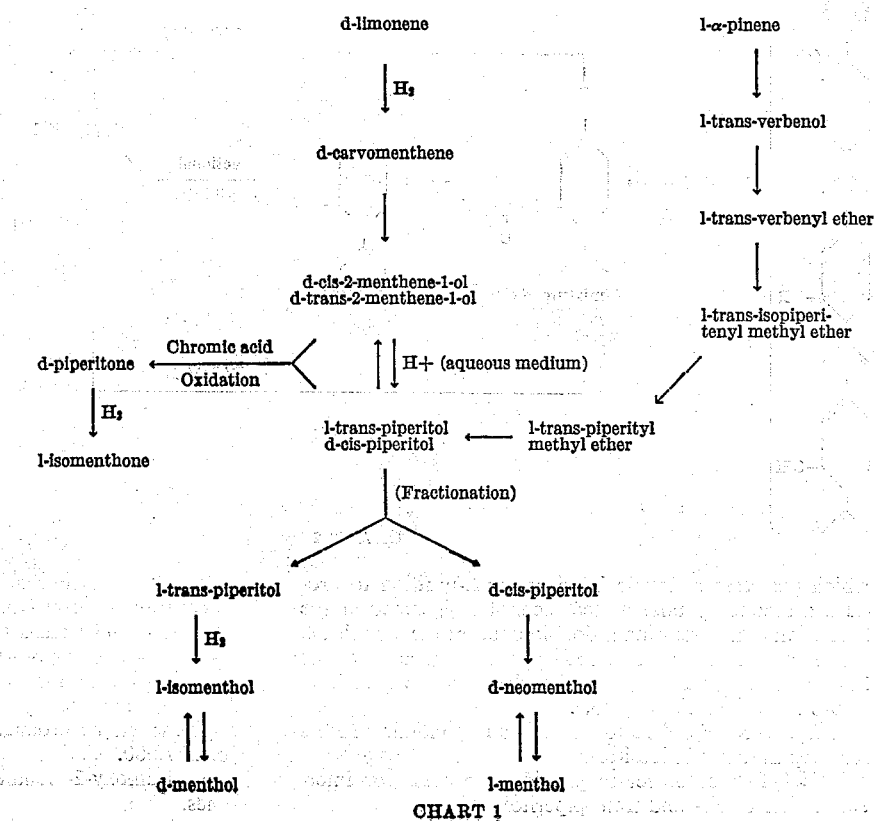

CHART 1

(5) That if l-menthol is desired, then the l-trans-piperitol must be converted to d-cis-piperitol prior to the hydrogenation step.

It is evident that if the optical sign of any compound shown in Chart 1 is changed, then every other member of the optically active system of compounds must be changed.

Thus, if d-limonene is replaced by l-limonene, then l-piperitone can be prepared, and it may be hydrogenated to d-isomenthone, which can be converted to l-menthol. To produce l-menthol, d-trans-piperitol can be hydrogenated, and any l-cis-piperitol that is at hand can be converted to trans-piperitol prior to hydrogenation.

It is evident then that l-menthol can be produced from either l-limonene or from d-limonene, providing that proper choice of intermediates is made.

We have found that to produce mixtures of the piperitols that either of the pure piperitols may be employed, and that there are several equivalents, as shown in Chart 2. These are (1) 2-menthene-1-ol, (2) 2-menthene-1-ol ethers and (3) piperityl ethers. Since the isopropyl group does not enter into the reactions, other starting materials containing a double bond at the 1-position of the p-menthane skeleton are also suitable raw materials instead of the compounds specified by name. Such compounds include the $\Delta^8$ analogues, 8-alkoxy-piperitols, 8-alkoxy-2-menthene-1-ols, 1,8-dialkoxy-2-menthenes, and the corresponding 8-hydroxy and 8-acetoxy compounds. Also esters of the above alcohols are capable of the same treatment.

It is accordingly an object of our invention to provide a process for treating an unsaturated tertiary alcohol or ether of the p-menthane series which is oxygenated at the 1-position and which possesses a double bond at the 2-position to produce a secondary unsaturated alcohol oxygenated at the 3-position and possessing a double bond at the 1-position.

It is a further object to split ethers oxygenated at the 3-position and possessing a double bond at the 1-position to the corresponding alcohols.

It is a further object to provide an economic process for preparation of piperitols.

It is a further object to provide a process for interconversion of cis- and trans-piperitol.

It is a further object to provide a process useful in the production of l-menthol.

It is a further object to provide a process useful in the conversion of optically active, domestically-occurring terpene hydrocarbons to optically active terpene compounds oxygenated at the 3-position of the p-menthane skeleton.

As raw materials for our treatment to produce piperitols and their unsaturated or substituted derivatives, we require compounds of the type:

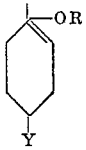

and

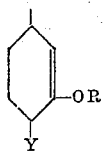

where R is alkyl or cycloalkyl or hydrogen and where Y is isopropyl, isopropenyl, α-hydroxy-isopropyl, α-acyloxy-isopropyl or α-alkoxy-isopropyl.

Representative compounds of these types are:

(1) Cis- and trans-2-menthene-1-ol, see Simonsen, "The Terpenes," volume I, 2nd edition, page 337, for preparation and properties of optically active cis- and trans-forms, see copending Serial No. 377,000, filed August 27, 1953.

(2) α- and β- (cis and trans) 2,8-p-menthadiene-1-ol, see copending Serial No. 377,000, filed August 27, 1953.

(3) Cis- and trans-2-p-menthene-1,8-diol.

(4) Cis- and trans-8-methoxy-2-menthene-1-ol, which can be made by air oxidation of 8-methoxy-carvomenthene resulting from addition of methanol to limonene or to pinene, in accordance with the procedures of Serial No. 377,000.

(5) 1-alkoxy-2-menthenes and 1-alkoxy-2,8-p-menthadienes.

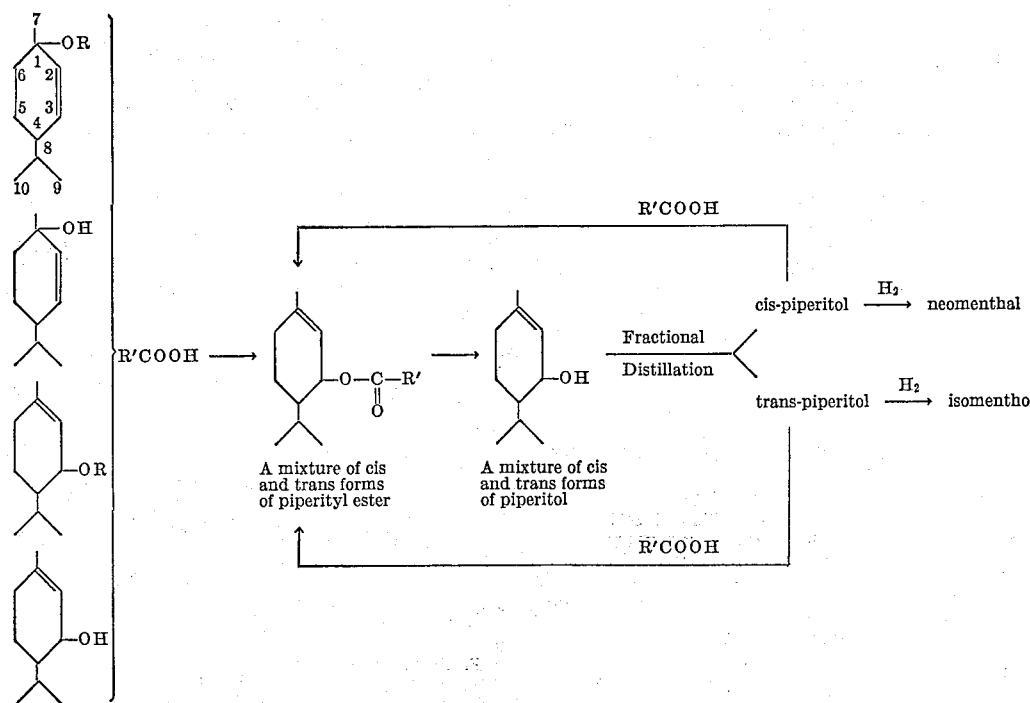

CHART 2

(6) Piperityl and isopiperitenyl methyl ethers.

As shown in Chart 2, the alcohol ester or ether of choice is treated with a carboxylic acid, whereby a mixture of cis- and trans-piperityl ester results. If the oxygenated starting material is one of the types of ethers shown, then also the ester $$R-O-\underset{\underset{O}{\|}}{C}-R'$$

is formed.

Treatment of such starting materials with boiling water or cold aqueous acids produces a four-component equilibrium mixture consisting of 2-menthene-1-ols and the piperitols as shown in Chart 1. Under such conditions, however, the equilibrium mixture is poor in piperitols, say 10 to 20%, and rich in the 2-menthene-1-ols. Since the latter are of no value for hydrogenation to menthol, it is desirable to convert them to the piperitols to a greater extent than can be accomplished by a single stage simple aqueous acid equilibration.

I find that by employing suitable carboxylic acids, it is possible to convert any member or any mixture of members of the four-component equilibration system to a two-component system consisting almost exclusively of cis- and trans-piperityl esters. The piperityl esters can be separated by fractionation if desired, but can also be saponified to a mixture of the two piperitols and then fractionated as by distillation. Since the piperitols can be crystallized, their purification by crystallization is also satisfactory.

It is known that the piperitols readily dehydrate to form phellandrenes and alpha-terpinene. Acids readily provoke this undesirable decomposition, and in order to produce piperityl esters most economically, it is preferable to choose certain conditions of time and temperature depending upon the identity of the piperitol precursor and the acid to be employed.

Such choice of conditions is also desirable in producing esters of isopiperitenol and related compounds. For example, when 2,8-p-menthadiene-1-ol is treated with excess formic acid at 25° C., isopiperitenyl formate is produced, but it decomposes to hydrocarbons so rapidly in the presence of this strong acid that the conversion at room temperature is not desirable for good yields of the isopiperitenyl formate. Much better yields of isopiperitenyl formate are obtained at temperatures of 0° C. or below. On the other hand, weaker acids than formic, such as acetic acid can be employed satisfactorily at ordinary ambient temperatures of 20° to 35° C. and above, whereas still weaker acids, such as benzoic acid, are not effective at ambient or lower temperatures but can be employed at 50° to 100° C.

It is possible, however, to modify the action of the acid to produce good yields of ester other than by relying on temperature modification alone. Thus, a strong acid such as formic acid can be buffered as by addition of a quantity of a salt of a strong base and a weaker acid. Addition of such salts as sodium acetate, potassium phosphate, calcium propionate or alkali or alkali earth formates to the formic acid prior to treatment of the organic alcohol or ether produces an esterifying reagent which can be used at higher temperatures than unbuffered formic acid without causing much formation of undesirable hydrocarbons.

The dehydrating action of formic and other relatively strong acids can also be suppressed by addition of amines and other basic compounds to the formic acid without blocking its esterifying action. It is known, for example, that organic ethers, such as ethyl ether, dioxane, cineole, etc., are weak bases, and it has been found that such compounds do suppress the dehydrating action of strong organic acids employed for preparation of their piperityl or isopiperitenyl type esters.

Some of the compounds it is proposed to treat are ethers, and it is clear that these require somewhat more vigorous esterifying conditions than do the corresponding alcohols and their allylic isomers. It is known that certain types of solvents can affect the activity of acids considerably. As described above, basic or proton acceptor-type solvents decrease the activity of carboxylic acids. Other types of solvents may tend to increase the activity of the acid. For example, Kharasch and Reynolds found that phenols increased greatly the ability of benzoic acid to esterify alpha-pinene to produce borneol esters, see "Journal of Organic Chemistry," volume 9, page 150 (1944). Other solvents such as benzene have little effect on our process. It is also known to catalyze esterifications with a weak acid by means of mineral acids, acid salts, boron fluoride and the like. While I can employ these, I prefer to employ esterification conditions whereby such catalysts can be avoided.

Further, the temperature range most suitable for formation of these esters depends on the concentration of the acid employed and upon the molar ratio of acid to the allylic terpenic compound being esterified. In general, it is preferred to employ an excess of the carboxylic acid over that required to form the ester. If the compound to be treated is an alcohol such as 2-menthene-1-ol, theory requires that one mole of organic acid is required for one mole of alcohol and that one mole of water is produced. On the other hand, if the compound to be treated is an ether such as 1-methoxy-2-menthene, then theory requires two moles of acid for reaction to produce one mole of piperityl ester, one mole of methyl ester and one mole of water. If, say 80–90% aqueous formic acid is employed, and in somewhat excess, the two phases which are present when the reaction is stopped will be found to separate easily; the upper phase is rich in esters and the lower phase is rich in aqueous formic acid. The aqueous formic acid phase can be recycled several times until it becomes so weak in formic acid that it is no longer economic to employ it. During the recycling operations, it may be found desirable to increase the temperature of each consecutive batch so that the last treatment takes place at say 25° C. of higher. The dilute aqueous unreacted formic acid or other acid can be recovered by conventional methods, and likewise the organic acid can be recovered from aqueous saponification liquors after saponifying the ester to recover the piperitol or other terpenic alcohol produced.

It is evident from the above that it is not helpful to specify the temperature, the dissociation constants of suitable acids, the buffer or solvent, if any, presence or absence of catalysts, molar ratio of acid to ether or alcohol being treated, etc., since conditions of treatment are mutually dependent. The value of any particular treatment, however, is not difficult to assay by infrared analysis or other examination of the product of treatment. Thus, since my invention is concerned with preparation of esters of piperitol, isopiperitenol and the like, it is necessary only to determine the ester content of the acid-free reaction product by saponification or by instrumental analysis. Infrared analysis supplies data not easily arrived at by other methods. Thus, saponification value provides only an estimate of the ester present and does not shed light on whether the treatment is insufficiently vigorous or too vigorous. Infrared analysis shows to what extent the starting material has been converted, the amount of desired product that is produced and to what extent the starting material has been converted to hydrocarbons or other undesirable products.

In conducting the treatment, I can employ pure compounds, but in general it will be found satisfactory to employ crude reaction products or fractions of these for treatment. Thus, one can employ the crude pyrolysis product obtained from 1-transverbenyl ether and which consists of 1-isopiperitenyl methyl ether as the major component, but also contains pseudo-verbenyl methyl ether and an enol methyl ether. On treatment with formic acid, the enol methyl ether is preferentially hydrolyzed and cyclized to yield a high boiling ketone. The isopiperitenyl methyl ether is hydrolyzed and esterified more slowly, and the pseudo-verbenyl methyl ether is unaffected. When the isopiperitenyl ester content reaches a maximum or prior thereto, the oil and aqueous layers are separated and the oil layer is saponified and fractionated to recover fractions rich in pseudo-verbenyl methyl ether, a mixture of the two isopiperitenols and the cyclic ketone. Hydrogenation of the mixed isopiperitenols yields a mixture of l-isomenthol and d-neomenthol. The two menthols are readily purified by fractionation, and each can then be equilibrated by known means to obtain a mixture of four menthols. The l-isomenthol equilibrates to form d-menthol as the chief component of the equilibration mixture, whereas the d-neomenthol equilibrates to form a mixture rich in l-menthol. It is evident that only the cis-isopiperitenol is useful as a source of l-menthol in this particular case. Since cis- and trans-isopiperitenols are more difficult to separate by fractionation than are the piperitols, an alternative procedure would consist of selectively hydrogenating the mixture of isopiperitenols to a mixture of cis- and trans-piperitols and separating these. Hydrogenation of the cis-piperitol to neomenthol followed by equilibration could yield l-menthol. The separated trans-piperitol can be esterified with formic acid to produce a mixture of esters of cis- and trans-piperitols suitable for saponification followed by fractional distillation to secure a further quantity of cis-piperitol for conversion to l-menthol.

Conversely, if the starting verbenyl ether is the dextro-form, the operation is conducted to favor isolation of trans-isopiperitenol or trans-piperitol prior to hydrogenation, since l-menthol results from this choice of isomers at the piperitol or isopiperitenol stage.

The starting materials need not be optically pure, but are preferably so if optically pure products are to be produced. Optically pure menthols can be produced, however, from optically active, but optically impure, starting materials. Thus, if the optical purity of the starting material is about 50% and if proper choice is made of cis-trans forms of intermediates, then l-menthol of about 50% optical purity can be produced. The optically impure menthol can be separated, if desired, into its components, the optically pure menthol and racemic menthol. A suitable means for accomplishing this purpose would be esterification of the optically impure l-menthol with oxalic acid followed by crystallization of the ester, a known process.

Alternatively, if dl-menthol is the desired product, then optically inactive raw materials can be used, and no choice of isomers is required at the isopiperitenol or piperitol stages, since the mixture on hydrogenation, followed by equilibration, yields a mixture of menthols rich in dl-menthols and from which pure dl-menthol can be isolated by well-known methods.

It is also evident from study of Chart 1 that if d-pinene or l-limonene are available, the mixed piperitols resulting from processing need not be separated but can be oxidized with chromic acid, such as a Beckmann mixture, to form l-piperitone, which on hydrogenation yields d-isomenthone, as is known. The d-isomenthone yields l-menthol when processed by known methods.

Choice of raw material for conversion to l-menthol will, of course, vary from time to time depending upon relative availability and cost, as well as upon cost of the various reagents and processing steps required for the particular type of conversion required. In any case, it is evident that I can employ either dextro- or levo-forms of the raw material, providing I make the choice of the proper form of a suitable intermediate form, and that further if I wish to produce dl-menthol, such choice is not necessary.

The essence of the invention involves the production of a mixture of cis- and trans-piperityl esters, or isopiperitenyl esters, or derivatives thereof, by treatment of any member or mixture of members of a class of compounds including piperitols, piperityl ethers, the 2-menthene-1-ols and their ethers, or the corresponding group of compounds having unsaturation or substitution in the isopropyl group, in the presence of hydrogen ions with a material providing carboxylate ions.

As discussed above, either dilute aqueous acids or boiling water is capable of converting any member of the four-membered allylic family consisting of the two 2-menthene-1-ols plus the two piperitols into a mixture of all four members of the family. Such an equilibrated mixture, however, chiefly consists of the tertiary alcohols which do not yield menthol on hydrogenation. Therefore, simple aqueous acid equilibration suffers from the defect that the piperitols are present only to a limited extent, say 10 to 20%, if the equilibration is complete. In the present invention we are concerned with establishing equilibration conditions of such a nature that the product is very largely in the piperityl form and as an ester. If the 2-menthene-1-ols do esterify, it is only to a very slight extent, whereas the piperitols are readily esterified under our conditions. Also the ethers of the two 2-menthene-1-ols and the two piperitols are substantially equivalents to the free alcohols, except that more carboxylic acid is required to treat the ether and the ethers react somewhat more sluggishly. Once the piperityl esters are formed, they can be treated to saponify them to piperitols without formation of any of the tertiary alcohols.

As shown in the experimental section, the choice of carboxylic acid is not critical, since both strong and weak acids can be employed, either monocarboxylic or polycarboxylic. In general, however, we prefer to employ formic or acetic acids, since these acids are quite satisfactory and can be recovered economically either from diluted aqueous solution or from their sodium salts.

While dilute aqueous acid, say 30% formic acid, can be employed, it is to be understood that treatments with such aqueous acids does not cause complete esterification of the alcohols, and that while the esterified alcohols are in the piperityl form, the unesterified alcohols will be largely in the acid equilibrated form and therefore will be present largely as 2-menthene-1-ols. It is therefore desirable to cause as complete esterification as possible economically and to employ, say 70 to 95%, formic acid, if that acid is chosen. Where acetic acid is employed, still stronger acid strength is desirable, say 95 to 100%, and it will be found that addition of acetic anhydride may also be desirable after esterification has proceeded for a time.

In treating ethers, it will be found desirable to avoid anhydrous acids such as glacial acetic acid, since some water should be present to assist the ether cleavage. Glacial acetic acid, therefore, is preferably diluted to say 95% strength to secure faster ether splitting, and then stronger acid or anhydride added to complete the esterification of the alcohols formed on splitting.

Further, it has been found that the ratio of cis- to trans-piperitol esters is not identical or constant during the esterification. For example, when 1-methoxy-2-menthene is treated with formic acid and samples of oil are withdrawn and saponified from time to time for analysis, it will be found that the piperitols produced are initially richest in the cis-form, and that as the reaction proceeds they become richer in the transform until at last about equimolecular quantities of the cis- and trans-forms are produced. Thus, if l-menthol is to be produced from d-limonene, the 1-methoxy-2-menthene derived therefrom is best processed with formic acid in the shortest time and with some sacrifice of 1-methoxy-2-menthene conversion, in order to secure a high ratio of cis- to trans-piperitol, say 7 to 3. On the other hand, if l-limonene is employed and it is desirable to produce menthol via hydrogenation of trans-piperitol followed by equilibration of the isomenthol produced, it will be found desirable to secure higher conversions of 1-methoxy-2-menthene and permit the reaction mixture to stand for a longer period of time in order to secure maximum trans-piperitol.

The treatments can be conducted either batchwise or continuously, the latter being somewhat preferable if it is desirable to secure maximum yields of cis-piperitol. Conversion of ethers to piperityl esters need not be complete as unchanged ether is readily recovered.

After the treatment is completed, the reaction mixture may or may not separate into two phases depending upon the acid employed, whether solvents are present, upon concentration of the reaction ingredients, etc. In employing the 85–90% formic acid of commerce, phases do ordinarily settle readily and good agitation is desirable during treatment. When treatment is complete, the lower aqueous formic acid is withdrawn and recycled or reconcentrated and the upper layer is saponified with an alkali or alkali earth in water or alcohol. In general, aqueous caustic soda solution is satisfactory and cheap and we prefer to employ it. Saponification is conducted by heating the mixture of aqueous alkali and the ester to 80° to 100° C. for a few hours.

Fractional distillation is conducted in vacuo at 10 to 30 mm. absolute pressure at the condenser. Distillation at higher pressures may tend to cause dehydration of the unsaturated alcohol.

Ordinarily we prefer to discontinue the esterification treatment before the maximum amount of piperityl ester is formed, particularly if the product under treatment is an ether. In this way, maximum yields of piperitols are obtainable based on the amount of starting material converted, since shorter treatments or less vigorous treatments result in less loss of product through hydrocarbon formation, and unchanged material is readily recovered during the fractional distillation step.

While it is preferred to employ acids for alcohol esterifications, it will be appreciated that other methods of esterification can be employed though less economically. It is preferable to employ fairly concentrated organic acids because through their use good allylomerization conditions coexist with good esterification conditions, and it is this simultaneous activity which permits most economic conversion of the tertiary alcohol allylomer to the piperityl derivative and the conversion of one piperitol epimer to the other. Also, in the case of ether conversions, splitting of the ether linkage and esterification are best brought about in presence of acids.

It has been found also that a piperityl ester fraction, rich in either the cis- or trans-form, can be treated under the preferred conditions with an acid to form a piperityl ester containing more equal proportions of the two forms. Thus, as stated above, when 1-methoxy-2-menthene is treated with formic acid for a short time, the piperityl formate produced is richest in the cis-isomer. If the isolated piperityl formate rich in the cis-isomer is again treated with formic acid, the piperityl formate recovered from the treatment will be less rich in the cis-form.

Perhaps the best explanation that can be advanced to explain the related phenomena described is that the tertiary alcohols and their ethers, the corresponding secondary alcohols and their ethers, and the esters of the secondary alcohols are all capable of and do generate a common ion when treated with acids under our preferred conditions, and that this ion reacts with the carboxylate ion of the acid to produce the mixed piperityl ester. Thus, it would be expected that if trans-piperityl butyrate were treated with a several molar excess of formic acid under our preferred conditions, there would result after a few hours a product consisting very largely of a mixture of cis- and trans-piperityl formates.

The various ethers, alcohols and esters suitable for treatment with carboxylic acids to produce mixed piperityl esters do not all react at the same rates with the same acid reagent. Thus, some ethers are more difficult to hydrolyze and esterify than others. Thus, optimum conditions in terms of conversion, reaction rates and the suppression of undesirable dehydration and polymerization may vary with each particular system undergoing treatment.

The following examples are illustrative of the invention:

Example 1

Ten ml. of $\beta$-2,8-menthadiene-1-ol was treated at room temperature, about 25° C., with 25 ml. formic acid. The homogeneous solution that resulted on mixing the reactants became dishomogeneous within a few minutes and a mildly exothermic reaction took place. After standing a few hours, the product was washed with water and with aqueous alkali and dried. Its infrared spectrum showed it still contained some terminal methylenic unsaturation, no alcohol and appreciable formate ester. The sample was now saponified with alcoholic alkali and the unsaponifiable portion was isolated. The unsaponifiable matter was a rather viscous pale yellow oil whose infrared spectrum showed no carbonyl (ester) absorptions, and considerable isopiperitenol. It was evident, however, that the acid treatment was sufficiently vigorous to bring about the formation of some polymer.

Example 2

Ten ml. of $\beta$-2,8-menthadiene-1-ol and a solution of 5 g. sodium acetate in 25 ml. 90% formic acid were cooled separately to 5° C., then mixed to form a homogeneous solution. After standing for 6 hours at about 10° C., the oil layer which had formed was separated and saponified with alcoholic caustic. The unsaponifiable fraction was isolated and was found by IR analysis to be almost pure isopiperitenol, though a mixture of cis- and trans-forms was present. The much milder acid treatment in this case than the treatment of Example 1 produced little or no polymer or dehydration of the alcohol.

Example 3

The experiment of Example 1 was repeated but at 5° C. with somewhat less polymerization, but some polymer was still present.

Example 4

Example 2 was repeated exactly, except that the alpha form of 2-8-p-menthadiene-1-ol was employed. Almost pure isopiperitenol resulted, but both cis- and trans-forms were present, as shown by the infrared analysis. This result shows that either the alpha or beta form of 2,8-p-menthadiene-1-ol can be employed to produce a mixture of the cis- and trans-forms of isopiperitenol.

Example 5

Ten ml. of isopiperitenyl methyl ether, obtained by fractionation of the pyrolysis products of verbenyl methyl ether, was cooled to 5° C. and treated with a cold mixture of 5 g. sodium acetate in 25 ml. formic acid. The reaction mixture was shaken at intervals, since some oil phase was present, and at the end of 8 hours an aliquot was saponified and the unsaponifiable was analyzed by infrared methods. The product consisted of a mixture of unreacted ether and isopiperitenol, about 50–60% of the latter. Another aliquot of the reaction mixture was saponified and analyzed after a total of 20 hours reaction time. About 70% isopiperitenol was present, as was also some unchanged ether. In all cases, the isopiperitenol was a mixture of cis-trans forms.

Example 6

The experiment reported in Example 2 was repeated exactly, except that cis-2-p-menthene-1-ol and an 8-hour reaction time was employed for the treatment. In this case the alcohol did not become homogeneous with the buffered formic acid, and the mixture required occasional shaking. After 8 hours, the oil phase was separated, saponified, dried and submitted to infrared analysis, which showed the product to consist largely of a mixture of cis-and trans-piperitols.

*Example 7*

A buffered formic acid solution was prepared by dissolving 15 g. sodium acetate in 100 ml. 90% formic acid. Thirty ml. of this solution was mixed at about 25° C. with 10 g. of piperitol consisting of about 90% trans- and 10% cis-forms. Two phases were present, and the mixture was shaken at 30-minute intervals over a period of 4 hours. The piperityl formates were then separated and saponified with methanolic KOH. The infrared spectrum of the recovered piperitols showed that the product was about 45% trans-piperitol and about 50% cis-piperitol, thus showing that trans-piperitol was converted to cis-piperitol by the acid treatment.

*Example 8*

Buffered formic acid was produced by dissolving 15 g. sodium acetate in 100 ml. formic acid, 90%. Thirty ml. of buffered formic acid, 10 ml. of 2-p-menthene-1-ol and 25 ml. butyric acid were cooled separately to 8–10° C., then mixed. The mixture was allowed to stand at 0–10° C. for 18 hours and remained homogeneous. This product was added to water, and the resulting oil phase was washed with water and saponified. The resulting alcohols were analyzed by infrared methods and found to consist of a mixture of cis- and trans-piperitols containing only small amounts of the cis- and trans-2-p-menthene-1-ols.

*Example 9*

Isopiperitenyl methyl ether, 882 g., was mixed with 8.8 g. of nickel catalyst in a rocking-type autoclave and hydrogenated at 340–605 p.s.i.g. at a temperature of about 110° to 124° C. Hydrogenation was stopped as soon as 0.979 mole of hydrogen per mole of ether had been absorbed. Infrared analysis showed that only 2 to 5% of the exocyclic double bond remained, and that therefore the product was piperityl methyl ether. The product was distilled, and a portion, 582 g. (boiling largely at 77–83° C. at 10 mm.), was treated with 582 g. of a buffered formic acid solution produced by treating 90% formic acid with 10% of its weight of sodium acetate. The reaction mixture was agitated at 25–30° C. for 4 hours. The oil layer was then separated and saponified, dried and fractionated at 10 mm. pressure to obtain a piperitol fraction, B.P. 95–105° C.

About 40% of the saponified product was piperitol. Of the piperitols, about 55% was the trans-form.

*Example 10*

The pyrolysis of verbenyl ethers is disclosed in co-pending application Serial No. 397,464, filed December 10, 1953, now Patent No. 2,871,268. Pyrolysis of verbenyl ethers conducted according to the processes disclosed yields a pyrolyzate rich in isopiperitenyl ethers, pseudo-verbenyl ethers, enol ethers and lesser amounts of unreacted verbenyl ether, hydrocarbons, polymeric and other materials.

Verbenyl methyl ether was heated at about 240° C. for 4 hours under autogenous pressure and in the liquid phase. A portion of the pyrolyzate was fractionated carefully to permit fairly accurate analysis of the individual fractions by infrared analysis. The analyses of the individual fractions permitted analysis of the crude pyrolyzate as follows:

| | Percent |
|---|---|
| Hydrocarbons | 2.5 |
| Pseudo-verbenyl methyl ether | 10.0 |
| Unreacted verbenyl methyl ether | 1.0 |
| Enol methyl ethers | 12–15 |
| Isopiperitenyl methyl ether | 53.0 |
| 5-methoxy-1,8-p-menthadiene | 5.0 |
| Residue | 8–10 |
| Unidentified materials | 3–5 |

To 3327 g. of the crude pyrolyzate there was added slowly and with stirring 75% of its weight of 90% formic acid. The reaction was maintained at 20–27° C. Some cooling was necessary at first since the hydrolysis of the enol ethers to ketones is exothermic. After all the formic acid had been added, the mixture was agitated for four hours. At first the reaction mixture was homogeneous, but two phases were present after about one hour of reaction. After reacting for four hours, the organic layer was separated and washed with water and with 10% aqueous alkali to remove most of the formic acid and methyl formate, and then the oil layer was saponified with alcoholic alkali, then recovered and dried. The loss of weight to this point was 7.5%.

Fractional distillation at 10 mm. pressure resulted in recovery of a large number of fractions which were analyzed by infrared analysis. The lower boiling products consisting almost entirely of ethers, but with some hydrocarbons and amounting to about 45% of the starting crude pyrolyzate, were retreated with formic acid under substantially the same conditions, and the saponified products were fractionated an analyzed by infrared analysis.

The analyses of all the various fractions from the two treatments were collated to calculate the recovery of various products in terms of percent by weight of starting crude pyrolyzate as follows:

| | Percent |
|---|---|
| Hydrocarbons | 4.7 |
| Pseudo-verbenyl methyl ether | 9.9 |
| 5-methoxy-1,8-p-menthadiene | 5.1 |
| Isopiperitenyl methyl ether | 2.1 |
| 2,8-p-menthadiene-1-ol | 1.4 |
| Isopiperitenol | 39.8 |
| Ketones | 8.1 |
| Distillation residues | 15.6 |
| Unidentified | 2.3 |

The isopiperitenol consisted of a mixture of cis- and trans-forms and was not easily separated from the ketones which boil close to the alcohol.

It was subsequently discovered that the crude pyrolyzate might be treated with small amounts of acids to split the ketone enol methyl ethers selectively, and that the ketones so produced could be separated from the non-enolic ethers by distillation. The recovered ethers containing none or little of the enolic ethers could then be treated to form isopiperitenol which contained little or no ketone as impurity.

*Example 11*

Isopiperitenyl methyl ether, 185 g., was added to a solution of 50 g. sodium acetate dissolved in 300 ml. 90% formic acid that had been cooled to about 0° C. The mixture, at about 8–9° C., was agitated and small samples were withdrawn periodically. These were saponified, and the saponification product was analyzed by infrared analysis for isopiperitenol.

| Reaction time: | Percent alcohol |
|---|---|
| 20 minutes | 6 |
| 1 hour | 12 |
| 2 hours | 17 |
| 6 hours | 31 |

The entire reaction product was processed to obtain the sample for the 6-hour reaction time, and after saponification and drying, the product was distilled to recover fractions representing 55% of the original isopiperitenyl ether, 4% of lower boiling hydrocarbons, and the isopiperitenol. The isopiperitenol was a mixture of the cis- and trans-forms.

Example 12

The above reaction was repeated except that the temperature throughout the reaction was maintained at 26.5–29.5° C. Samples were withdrawn periodically and saponified to recover the alcohol-rich product. The product from the saponification of a sample of the formic acid treatment lasting 60 minutes contained 38% isopiperitenol and the product from saponification of a 2-hour formic acid treatment contained 46% isopiperitenol. About twice as much hydrocarbon was formed as in the preceding example.

Example 13

Isopiperitenyl methyl ether, 50 ml., and 100 ml. water were boiled for eight-and-a-half hours. A sample of the oil layer was analyzed and found to contain 34% alcohols, largely the cis- and trans-forms of 2.8-menthadiene-1-ol and smaller quantities of isopiperitenol.

Example 14

Isopiperitenyl methyl ether, 20 ml., and 21 ml. of 1% aqueous sulfuric acid were agitated together for 30 minutes at room temperature. The infrared spectrum of the oil layers showed that little change had taken place. The mixture was then agitated at 50° C. for seven-and-a-half hours. The oil layer now contained 32% alcohols, largely the tertiary alcohols, cis- and trans-2,8-p-menthadiene-1-ol and a smaller amount of isopiperitenol.

Example 15

(A) Isopiperitenyl methyl ether, 10 ml., and 10 ml. of glacial acetic acid were mixed and allowed to stand for 24 hours. The ether was not split.

(B) Isopiperitenyl methyl ether, 10 ml., was agitated with a mixture of 20 ml. acetic acid and 5 ml. of 1% aqueous sulfuric acid and then allowed to stand for 24 hours at room temperature. After separating the oil layer and saponifying it, the product was found to contain 46% alcohols, about half isopiperitenols and about half 2,8-p-menthadiene-1-ol. It was evident that while hydrolysis of the ether took place readily, the alcohols formed were only partly esterified.

(C) An aqueous solution of maleic acid was produced by boiling 10 g. maleic anhydride with 15 cc. water, and this was cooled to 25° C.; then 10 ml. isopiperitenyl methyl ether was added. After agitating the mixture for 3 hours, it was saponified. The recovered oil contained a mixture of 22% alcohols isomeric with isopiperitenol but poor in this component.

(D) Reaction C above was repeated but in the presence of 3 ml. morpholine. At the end of 18.7 hours agitation, the product was separated and found to contain after saponification 32% alcohols isomeric with isopiperitenol but not rich in this component.

(E) Isopiperitenyl methyl ether, 10 ml., and 10 ml. of 90% aqueous acetic acid were mixed and allowed to stand for 19 hours. After saponification of an aliquot, little alcohol could be detected. In 46.2 hours, about 3% alcohol was present.

(F) A mixture of 20 ml. dioxance, 5 ml. 90% formic acid and 10 ml. isopiperitenyl methyl ether was allowed to stand 24 hours at room temperature and then saponified. Little or no alcohol was formed.

(G) Isopiperitenyl methyl ether, 20 ml., was agitated at room temperature for 24 hours with 100 ml. of 30% aqueous formic acid. About 50% of the ether was split and about 70% of the alcohols recovered after saponification was isopiperitenol. This reaction shows that even fairly dilute formic acid is effective in producing esters saponifiable to isopiperitenol, though more concentrated formic acid would have yielded isopiperitenol in higher proportion relative to the total alcohols present.

Examples 16–35

10-ml. samples of 1-methoxy-2-menthene were treated with various reagents at different temperatures for various lengths of time. At the end of the reactions period, the acid reagent was washed out of the oily product first with water and then with sodium bicarbonate. The product, containing an ester of piperitol, was then saponified and analyzed by infrared analysis. The experiments show the need for adjustments in temperature, solvents and time of reactions when various types of acids are employed in splitting 1-methoxy-2-menthene with acids to form piperityl esters.

| Ex. | Reagent | Time—Hours | Temp. °C. | Result of treatment |
|---|---|---|---|---|
| 16 | 15 ml. 95% aqueous butyric acid. | 120 | ca. 20–25 | About 5% piperitols, remainder the starting ether. |
| 17 | 15 ml. 95% aqueous propionic acid. | 160 | ca. 20–25 | About 7% piperitols, remainder the starting ether. |
| 18 | 10 ml. acetone plus 15 ml. of 5% by weight oxalic acid in glacial acetic acid. | 24 | 10 | About 35% piperitols and remainder largely starting ether. |
| 19 | do | 120 | 10 | Same as Example 18, but trace of phellandrenes and slightly less unreacted ether. |
| 20 | 15 ml. 95% glacial acetic acid containing 5% oxalic acid. | 22 | 20–25 | About 20% piperitols but substantial loss of ether due to other reactions. |
| 21 | 15 grams maleic acid, never dissolved completely in the ether. | 22 | 20–25 | About 5% alcohols, most of starting ether had decomposed otherwise. |
| 22 | 15 grams maleic acid plus 15 ml. acetone. | 24 | 10 | About 25% piperitols, considerable unchanged ethers. |
| 23 | do | 120 | 10 | About 15% piperitols and less unchanged ether than in Example 22. |
| 24 | 15 mls. of a mixture consisting of 95% acetic acid, 2% phosphoric acid and 3% water. | 22 | 20–25 | About 25% piperitols, remainder largely ether and phellandrenes. |
| 25 | do | 24 | 10 | 37% piperitols, remainder largely ether. |
| 26 | do | 120 | 10 | 37% piperitols, but considerably less ether than in Example 25. |
| 27 | 15 grams chloracetic acid; mixture did not become homogeneous. | 22 | 20–25 | Most of the ether was destroyed, but only traces of alcohols were present. |
| 28 | 10 ml. acetone and 15 grams chloracetic acid. | 24 | 10 | About 25% piperitols, but little starting ether remained. |
| 29 | do | 120 | 10 | About 15% piperitols, but little starting ether remained. |
| 30 | 15 ml. 95% aqueous acetic acid. | 22 | 20–25 | About 35% piperitols, remainder very largely unreacted ether. |
| 31 | do | 144 | 20–25 | About 42% piperitols, much less unreacted ether than in Example 30. |
| 32 | 15 ml. glacial acetic acid. | 22 | 20–25 | About 3% piperitols, remainder unreacted starting ether. |
| 33 | 15 ml. 95% aqueous butyric acid containing 0.01% $H_2SO_4$. | 24 | 20–25 | Trace of alcohol. |
| 34 | 15 ml. 95% aqueous butyric acid. | 24 | 50 | About 33% piperitol, remainder largely unchanged ether. |
| 35 | do | 24 | 75 | About 31% piperitol, but much less ether remaining than in Example 34. |

Example 36

300 grams of trans-piperitol, $\alpha_D^{25}$ (10 cm.) −49°, was added slowly to a mixture of 600 grams of 90% formic acid and 90 grams of anhydrous sodium acetate at 0–5° C.

The reaction mixture was stirred at 0–5° C. for one hour. The oil layer was then separated and washed with a NaHCO$_3$ solution to remove unreacted formic acid. The washed oil, 373 grams, was then fractionated through an efficient column at 10 mm. pressure to yield 5–10% hydrocarbons, 85–90% piperityl formate, mixture of cis and trans, B.P., 10 mm., 96–100° C., N$_D^{25}$ 1.4646, D$_4^{25}$ 0.9545, $\alpha_D^{25}$ (10 cm.) +36°, and 3–5% unchanged piperitols. Saponification of a portion of piperityl formate fraction gave a mixture of cis- and trans-piperitols.

*Example 37*

200 grams of l-cis-piperitol, $\alpha_D^{25}$ (10 cm.) −255°, is treated with 500 ml. glacial acetic acid at 10° C. The homogeneous solution is allowed to stand for 48 hours at 10 to 25° C., and then the excess acetic acid is removed by water wash. After neutralizing the oil layer by washing it with sodium bicarbonate solution, the ester is fractionated at 5 mm. pressure. After removal of a small amount of free alcohols, B.P. 70–85° C., containing some 2-menthene-1-ol, the pure piperityl acetate, B.P. 90–95° C. at 5 mm., distills. The ester shows N$_D^{25}$ 1.462, D$_4^{25}$ 0.950, $\alpha_D^{25}$ −31° (10 cm. tube). On saponification it yields a mixture of l-cis and d-trans-piperitols.

This application is a continuation-in-part of application Serial No. 382,839, filed September 28, 1953, and now Patent No. 2,894,040.

Having described the invention, what is claimed is:

1. The process for producing esters of $\Delta^1$-3-hydroxy secondary alcohols of the p-menthane series which consists essentially in treating a mixture of a hydroxy compound of the p-menthane series selected from the class consisting of (1) those having a hydroxyl group at the 1-position and a non-conjugated disubstituted double bond in the 2,3-position as the sole cyclic double bond and (2) those having a hydroxyl group in the 3-position and a non-conjugated tri-substituted double bond in the 1,2-position as the sole cyclic double bond and a carboxylic acid at a hydrogen ion concentration in the range of that produced by boiling distilled water and 90% formic acid at a temperature of 0° C. to 100° C. for a time sufficient to bring about a substantial increase in the ester content of the mixture, whereby there is produced a mixture of the cis and trans forms of a carboxylic acid ester of a 3-hydroxy compound of the p-menthane series having a double bond in the 1,2-position.

2. The process of claim 1 in which the starting alcohol is a monohydric alcohol.

3. The process of claim 1 in which the hydroxy compound is produced in situ by hydrolysis from an ether thereof.

4. The process for producing esters of $\Delta^1$-3-hydroxy alcohols of the p-menthane series which consists essentially in treating a mixture of a lower alkyl ether of a monohydroxy compound of the p-menthane series having the alkoxy group in the 1-position as the sole substituent on the molecule and a non-conjugated double bond in the 2,3-position as the sole cyclic double bond and a carboxylic acid at a hydrogen ion concentration in the range of that produced by boiling distilled water and 90% formic acid at a temperature of 0° C. to 100° C. for a time sufficient to bring about a substantial increase in the ester content of the mixture whereby there is produced a mixture of the cis and trans forms of a carboxylic acid ester of a 3-hydroxy compound of the p-menthane series having the double bond in the 1-position.

5. The process for producing esters of $\Delta^1$-3-hydroxy-secondary alcohol of the p-menthane series which consists essentially in treating a mixture of a hydroxy compound of the p-menthane series having a hydroxyl group in the 1-position and a non-conjugated double bond in the 2,3-position as the sole cyclic double bond and a carboxylic acid at a hydrogen ion concentration in the range of that produced by boiling distilled water and 90% formic acid at a temperature of 0° C. to 100° C. for a time sufficient to bring about a substantial increase in the ester content of the mixture, whereby there is produced a carboxylic acid ester of a 3-hydroxy compound of the p-menthane series having a double bond in the 1,2-position.

6. The process of claim 5 in which the hydroxy compound is produced in situ by hydrolysis from an ether thereof.

7. The process of claim 6 in which the ether is a lower alkyl ether of 1-hydroxy-2-p-menthene.

8. The process of claim 6 in which the ether is a lower alkyl ether of 1-hydroxy-2,8-p-menthadiene.

9. The process of claim 5 in which the hydroxy compound is 1-hydroxy-2-p-menthene.

10. The process of claim 5 in which the hydroxy compound is 1-hydroxy-2,8-p-menthadiene.

11. The process for producing esters of $\Delta^1$-3-hydroxy-secondary alcohol of the p-menthane series which consists essentially in treating a mixture of a hydroxy compound of the p-menthane series having a hydroxyl group in the 3-position and a non-conjugated trisubstituted double bond in the 1,2-position as the sole cyclic double bond, which compound is predominately in one of the cis-trans forms thereof, and a carboxylic acid at a hydrogen ion concentration in the range of that produced by boiling distilled water and 90% formic acid at a temperature of 0° C. to 100° C. for a time sufficient to bring about a substantial increase in the ester content of the mixture, whereby there is produced a carboxylic acid ester of the 3-hydroxy compound in which the amount of the form originally predominating is decreased and the amount of the form originally present in minor amount is increased.

12. The process of claim 11 in which the hydroxy compound is formed in situ by hydrolysis from an ether thereof.

13. The process of claim 12 in which the ether is a lower alkyl ether of 3-hydroxy-1,8-p-menthadiene.

14. The process of claim 12 in which the ether is a lower alkyl ether of piperitol.

15. The process of claim 11 in which the hydroxy compound is a 3-hydroxy-1,8-p-menthadiene.

16. The process of claim 11 in which the hydroxy compound is piperitol.

17. The process for producing esters of $\Delta^1$-3-hydroxy-secondary alcohol of the p-menthane series which consists essentially in treating a mixture of an optically active 1-hydroxy-2-p-menthene and a carboxylic acid at a hydrogen ion concentration in the range of that produced by boiling distilled water and 90% formic acid at a temperature of 0° C. to 100° C. for a time sufficient to bring about a substantial increase in the ester content of the mixture, whereby there is produced a mixture of optically active cis- and trans-forms of piperityl ester, separating the cis- and trans-forms of said ester and treating one of said separated forms with a lower aliphatic monocarboxylic acid to produce a mixture of optically active cis- and trans-esters of piperitol.

18. A process for producing a mixture of cis- and trans-forms of optically active piperitol esters, which consists essentially in treating a mixture of carboxylic acid ester of one of said forms with a lower aliphatic monocarboxylic acid at a temperature between 0° C. and 100° C., whereby a mixture of optically active cis- and trans-esters of piperitol and said monocarboxylic acid is formed.

References Cited in the file of this patent

FOREIGN PATENTS 532,614    Great Britain _____ Jan. 28, 1941

OTHER REFERENCES

Locquin et al.: Compt. Rend. 174 (1922), p. 1711–3.
Simonsen et al.: "The Terpenes," vol. 1 (1953), p. 286.